United States Patent Office 3,386,989
Patented June 4, 1968

3,386,989
PROCESS FOR CONTINUOUS PRODUCTION OF CARBON TETRAFLUORIDE
Peter Karl Baumgarten, Holiday Hills, Wilmington, Del., assignor to E. I. du Pont de Nemours and Company, Wilmington, Del., a corporation of Delaware
No Drawing. Filed Aug. 23, 1966, Ser. No. 574,321
9 Claims. (Cl. 260—653)

ABSTRACT OF THE DISCLOSURE

A continuous process for producing carbon tetrafluoride comprising in combination a first particular arrangement for passing molten calcium fluoride downwardly through a bed of specific size carbon particles while passing a stream of chlorine gas upwardly through the bed, the first arrangement also providing for removal of a molten by-product from the bottom of the bed under certain specific conditions; and a second particular cooperating arrangement for recovering and recycling calcium fluoride from the molten by-product.

---

This invention relates generally to an improved continuous high efficiency process of commercial feasibility for the production of carbon tetrafluoride. More specifically, the invention involves such a process combination in which a particular arrangement for reacting the feed materials of carbon, calcium fluoride, and chlorine is advantageously integrated with a particular arrangement for recovering and recycling calcium fluoride from the molten by-product of the reaction. The cooperation or interaction between the two particular arrangements results in significant benefits and improvement in efficiency.

Carbon tetrafluoride is used as an aerosol propellant and as a refrigerant gas. In addition, carbon tetrafluoride is useful as an intermediate in the manufacture of fluorochemicals.

A number of processes are generally known that produce carbon tetrafluoride from carbon, chlorine, and calcium fluoride, such as those disclosed in the prior U.S. Patents 2,709,185, to Muetterties, and 2,924,623, to Hager. However, these prior processes possess certain disadvantages and deficiencies insofar as teaching or achieving a completely integrated, practical, high efficiency, continuous, commercial process is concerned.

It is one object of this invention to provide such a continuous commercial process which avoids the disadvantages and overcomes the deficiencies of the prior art processes, yet achieves high efficiency and high reliability with an easily controllable and low cost arrangement of process steps.

Additional objects and advantages will appear from the following specification and claims.

The objects of the invention are achieved in a continuous integrated process for producing carbon tetrafluoride which generally comprises at least some of the following steps in combination: continuously flowing a stream of gaseous chlorine and a stream of molten calcium fluoride, with the molar ratio of chlorine to calcium fluoride being in the range from about 1:4 to about 4:1, countercurrently to each other through a vertically elongated mass of carbon particles confined in a reaction zone, said mass predominantly composed of carbon particles having dimensions in the range between about ⅛ inch minimum and a maximum of about 2 inches or 1/16 of the minimum transverse dimension of the mass of carbon particles, whichever is the smaller the temperature in said zone maintained in the range from about 1300° C. to about 2500° C., the pressure of said stream of gaseous chlorine maintained between about atmospheric pressure and about eight atmospheres as said stream enters said mass, to form a gaseous product comprising a high percentage of carbon tetrafluoride and a minor percentage of chlorofluorocarbons (chlorine-free basis) and to form a molten by-product comprising calcium chloride and calcium fluoride; continuously removing said gaseous product, separating from said product a gaseous fraction consisting essentially of chlorine and chlorofluorocarbons, and adding said gaseous fraction to said stream of gaseous chlorine, said process further comprising continuously removing said molten by-product at a temperature significantly above about 800° C., separating from said by-product a fraction consisting essentially of calcium fluoride, adding said fraction to said stream of calcium fluoride, and adding carbon particles to said mass to maintain the size of the mass and the average particle size within desired operating limits.

Other objects and aspects of the invention relate to the particular process arrangement for reacting the feed materials with concurrent desired control of the by-product stream temperature, and also the particular cooperating process arrangement for recovering and recycling the calcium fluoride from this by-product stream.

The chemical reaction portion of the preferred continuous commercially feasible process for preparing carbon tetrafluoride essentially free of chlorofluorocarbons from calcium fluoride, carbon, and chlorine, comprises flowing chlorine upwardly and molten calcium fluoride downwardly, countercurrently to each other, through a vertically elongated mass of carbon particles in the form of calcined petroleum coke. The mass of carbon particles is confined in a reaction zone in a suitable substantially vertical reactor structure somewhat similar to the reactor arrangement shown in U.S. Patent 2,884,467, but commercial large scale design and fabricated with a strong steel outer shell and a lining of substantially impervious graphite with an average corrosion rate of about 1.4 to 3.3 inches/year under the preferred process conditions which are indicated as follows:

Preferred temperature in mass of carbon particles during reaction: 1500° to 1550° C. (more general operating range: about 1300° to about 2500° C.)
Preferred gas pressure in reactor: 3 to 4 atmospheres absolute (more general operating range: about 1 to about 8 atmospheres absolute)
Preferred superficial velocity of chlorine at reaction zone conditions, ft./sec.: 0.3–0.6 (more general operating range: 0.2 to about 2)
Preferred depth of mass of carbon particles in the reaction zone, ft.: 8 to 20 ft. (more general operating range: at least about 1 ft.)
Preferred calcium fluoride feed composition: at least 97% $CaF_2$ by wt.; less than 0.1% $H_2O$ by wt. (more general operating range: 90–100% $CaF_2$ by wt.; 0–10% $CaCl_2$ by wt.; 0–4% $H_2O$ by wt.)
Preferred feed ratio, moles $CaF_2$/mole $Cl_2$: 2:3 to 3:2 (more general operating range: 1:4 to 4:1)
Preferred carbon particle size: Nominal ⅛–¼ inch (more general operating range: between about ⅛ inch to about 2 inches, or 1/16 of the minimum transverse dimension, whichever is the smaller).

For economical commercial operation the reactor structure should be constructed so that the mass of carbon particles is more than one reaction stage deep and preferably should be designed to operate substantially adiabatically. The basic chemical reaction of the process is exothermic in nature. However, the temperature distribution in the mass of carbon particles may be regulated by heating and/or cooling equipment operatively associated with the reactor structure, by control of the size of carbon particles in the reaction zone, or by control of the chlorine feed temperature if desired. Maintaining a rather small size of carbon particles in the reaction zone tends to bring the chlorine and molten calcium fluoride temperatures close together and to maintain a temperature maximum in an intermediate portion between the upper and lower portions of the vertically elongated reaction zone in the reactor.

Calcium fluoride is continuously supplied at controlled rates to the top portion of the vertically elongated zone while chlorine is continuously supplied at controlled rates and temperatures to the bottom portion of the reaction zone. The flow of molten calcium fluoride, which becomes converted to comprise a substantial portion of calcium chloride, as it moves downwardly through the mass of carbon particles should be substantially direct flow through the mass without significant recirculation (back-mixing) within the mass. The flow rate of chlorine supplied should be adjusted relative to the transverse dimensions of the reaction zone, the size of the carbon particles, and the flow of molten calcium fluoride, so that within the feed proportions, significant downward flow of calcium fluoride is achieved without flooding or accumulation of molten calcium fluoride at the top of the reaction zone and mass of carbon particles. Additional carbon particles are supplied as required to the top portion of the reaction zone. The gaseous reaction product is continuously collected and removed from the upper or top portion of the reaction zone while the molten by-product is continuously removed at a controlled temperature from the bottom of the reaction zone. The molten by-product leaving the reaction zone is quenched in water under controlled conditions, leached with water to remove calcium chloride, filtered and washed until the solid residue of calcium fluoride contains not more than about 10 percent by weight of calcium chloride. The recovered calcium fluoride is heated in a current of dry air or inert gas to above about 900° C. in order to drive off moisture and is recycled while in heated condition into the calcium fluoride feed stream entering the top portion of the reactor. Calcium chloride in the recycled calcium fluoride is detrimental to formation of carbon tetrafluoride. The particular temperature at which the molten by-product is removed has special significance with respect to effective cooperation between the basic countercurrent chemical reaction and the recovery and recycling of calcium fluoride from the molten by-product. Generally the temperature at which the by-product is removed must be sufficiently high, for the proportion $CaF_2$ to $CaCl_2$, so that it is above the temperature at which the difficulty filterable double salt compound CaFCl is formed or exists. In the preferred version of the process the removal temperature is above 800° C. As disclosed in U.S. Patent 2,671,755, CaFCl decomposes in water to form a suspension of gelatinous, somewhat colloidal calcium fluoride in calcium chloride solution. Such suspension is difficult to filter and wash.

The gaseous product leaving the upper portion of the reaction zone is preferably quenched to about 400° C. or lower to prevent (1) loss of carbon tetrafluoride therefrom and (2) chemical reaction to form carbon tetrachloride or other substances in the presence of fine carbon, which is entrained in the gaseous product, as the gaseous product is being cooled. The cooled gaseous product is separated by conventional means, preferably by liquefaction and fractional distillation into carbon tetrafluoride, a chlorofluorocarbon product if desired, and a residue comprising chlorine, fluorine-containing organic reaction products and minor amounts of products such as HF, $SiCl_4$, $COCl_2$, formed from impurities in the feed stream. The residue which consists essentially of unused chlorine and certain chlorofluorocarbons, with minor amounts of other fluorine-containing organic reaction products, may be recycled to the lower portion of the reaction zone with the chlorine feed stream. In order to avoid deposition of fine carbon in the lines, the recycle stream should be below about 400° C. prior to addition to the chlorine stream.

The mass of carbon particles is essentially a substantially non-fluidized, packed bed of petroleum coke. As the reaction proceeds the carbon particles are gradually consumed and become progressively smaller as they move downwardly through the mass or reaction zone. Additional carbon particles are added at the top portion of the zone as required and the reactor conditions are controlled to maintain the particles in the optimum desired size range and the size of the mass in the required limits. A special factor relating to the optimum particle size and distribution is the non-wetting of carbon by molten calcium fluoride-calcium chloride mixtures. The presence of carbon particles in sizes above the preferred range decreases the surface area and reaction rates, and also increases the downward movement of the molten calcium fluoride through the particle mass unless counterbalanced by sufficient velocity of the upward moving chlorine stream. Additionally this would require excessive depth of the mass for a given output. On the other hand, the presence of an excess of particles below this size range will actually cause the downward flow of molten material to slow down or stop. This flooding condition is related to and aggravated by the fact that the molten material does not wet the carbon particles; hence the depth of molten by-product just sufficient to enter an opening between carbon particles is greater the smaller the opening. Carbon particles can be maintained in the desired size range by causing them to pass through and/or by removed from the reaction zone before their size drops below the lower or minimum size limit. The carbon particles may be removed from the mass as desired by any suitable arrangement such as for example: a grate mechanism at the bottom of the mass, or by periodic increase in gas flow rate to elutriate the smaller carbon particles. The size of the mass of carbon particles maintained in the reaction zone should be rather deep or considerably elongated vertically in order to provide a reaction zone which has a depth corresponding to a plurality of theoretical reaction stages for the rates of chlorine and calcium fluoride fed, the carbon particle size, and the pressure and temperature of the reaction zone. A theoretical reaction stage is a length or "height" of a section of reaction zone, such that the gaseous products and the liquid products leaving the section are in chemical equilibrium with each other at the prevailing temperature and pressure. (At 1500° C. and equimolar feed ratio of $Cl_2/CaF_2$, the total $CaF_2$ conversion is estimated to be about 32% in a single theoretical reaction stage at 3 atm. absolute pressure and about 23% at atmospheric pressure.) The dimensions of the carbon particles will be in the range between about 1/8 inch minimum and a maximum of about 2 inches or 1/16 of the minimum transverse dimension of the mass of carbon particles, whichever is the smaller.

The portion of the preferred process relating to the efficient recovery and recycling of calcium fluoride from the molten by-product of the chemical reaction portion of the process, comprises receiving the molten by-product comprising calcium fluoride and calcium chloride at a temperature above the temperature at which the double salt compound CaFCl is formed or exists, preferred to be above 800° C., cooling the molten by-product sufficiently rapidly to at least about 400° C. to prevent formation of the double salt compound CaFCl. Preferably the molten by-product is quenched and comminuted by an excess of cooling liquid, such as water for example which then also leaches the calcium chloride from the solidified product. Various suitable means known in the art of granulating blast furnace slag and similar viscous glassy slags can be employed for quenching the molten by-product. Preferably the molten by-product is cascaded over a shaped graphite pouring lip to shape a falling stream about ¼ to ½ inch thick and as wide as necessary to obtain a desired rate of melt throughput. The melt stream is caught in a pool of water a short distance below the pouring lip. A jet of cooling liquid, preferably water, is impinged in an oblique downward direction against the falling melt stream a short distance above the water level in the pool. This comminutes and cools the melt and propels particles of the partly cooled melt into the water pool where quenching is completed and leaching of calcium chloride by the unevaporated cooling water takes place. The relative flow rates of the cooling water in the jet and the melt are generally in the range of 5 to 80 lbs. of water to one pound of melt, preferably about 20 lb. water/lb. melt. Regulation of the cooling water temperature, as by recycling of water through the jet, or by cooling the water so recycled, permits some control over the particle size of the solidified melt. Various suitable arrangements for quenching the molten material are available, such as, for example: cooling a thin film of the slag in a prechilled metal member or drum, spraying the molten material into cold (−175° C.) nitrogen gas or a mass of granulated solid carbon dioxide. The particulate solidified melt and the cooling water containing calcium chloride are transferred by suitable means, such as a gravity chute or conveyor means which will not seriously reduce the particle size, to a thickener means in which further leaching of the solid residue takes place. Leached residue is filtered and washed on a conventional rotary filter means provided with a relatively open filter cloth, made for example of nylon twill which is resistant to the calcium chloride solution.

The wet filter cake of recovered calcium fluoride is extruded into the form of elbow macaroni and dried at a temperature of at least 170° C. in a slowly moving atmosphere of dry air until the solid is substantially anhydrous. It is preferable to dry the filter cake in the temperature range 500–900° C. where the melting point of the filter cake will permit, most perferably in the range of 500–600° C. A slow current of air at atmospheric pressure should circulate through the drying means which preferably is indirectly heated. Elimination of moisture in the dried product is important since moisture leads to formation of hydrogen fluoride and other unwanted products in the basic chemical reaction of the process. Since the anhydrous calcium fluoride will pick up moisture from the air, it should be handled in a dry atmosphere as it is being conveyed and recycled into the reactor with the main calcium fluoride feed. This recycling is accomplished, preferably, while the recovered calcium fluoride retains its heat from the drying operation.

A helpful interesting disclosure of more detailed information relating to $CaCl_2$—$CaF_2$ mixtures and their behavior at various temperature levels is "Freezing Phenomena in Inorganic Salts and Salt Mixtures," Plato, S., Z.f. Phys. Chem. 58, 361–364 (1907).

Various aspects of the invention are illustrated in greater detail in the following examples. In these examples countercurrent flow of chlorine and calcium fluoride occurred through the carbon reactor packing. With the exception of Example I, the reactor used in each example comprised a vertical 22 inch O.D. x 14 foot long carbon steel outer shell concentrically surrounding a 12 inch I.D. x 14 inch O.D. graphite liner, with the annular space between the shell and liner filled with high temperature carbon-black insulation. A graphite U-tube, carbon impregnated and refired to make it impervious to the process conditions, with 1.95 inches I.D. and 2.75 inches O.D. was secured inside the graphite liner. One arm of the U-tube was used as a chlorine preheater, and the other arm used as the main reactor structure generally defining the chemical reaction zone. Chlorine was supplied to the preheater arm of the U-tube at the top, flowed downward through about 3 feet of ¼–½ inch calcined coke particles, turned the U, and then moved upwardly through about 9 feet of carbon reactor packing, comprising a mass of carbon particles, to the product gas outlet.

Acid-grade fluorspar (98% by weight calcium fluoride) in particulate form, was fed from a hopper by a screw feeder to the top of the mass of carbon particles which extended above the product gas outlet into a calcium fluoride melting zone. The calcium fluoride was melted in the top 14 inches of the mass of carbon particles above the product gas outlet and then moved down through the reactor packing, or carbon particle mass, to an S-trap from which the molten by-product or slag was discharged for its further handling. The gaseous product left the mass of carbon particles just below the melting zone through another graphite tube and was thoroughly cooled in a cooling means. Heat supplied to the reactor structure was generated in the walls of the U-tube itself by electrical currents of up to 1200 amperes. In order to maintain desired temperature conditions, auxiliary or additional heat was supplied by helical graphite resistors surrounding the melting zone and the S-trap. Power required to bring the reactor structure up to operating temperatures was about 70 kw.; for steady-state operation at about 1520° C. it was about 40 kw. Both the reaction zone and fluorspar feeding portion of the arrangement were protected by rupture disks.

Argon was fed, mixed with the chlorine feed at 15% of the chlorine flow as a tracer to confirm chlorine conversion as determined from wet analysis. Nitrogen was maintained in the top portion of the reactor structure to exclude other gases, such as air and product gas, from the calcium fluoride melting zone. The average level of the top of the mass of carbon particles or reactor packing was maintained substantially constant by addition of carbon particles at intervals of several hours on stream. Except as otherwise stated, the reactor packing of carbon particles consisted of calcined petroleum coke. The initial mass of carbon particles and the added particles were, except as otherwise stated, in the nominal range of ⅛ to ¼ inch transverse dimension, more particularly 1% by weight on 3-mesh (0.263 in. opening), 73% on 6-mesh (0.131 in. opening), 26% on 10-mesh (0.065 in. opening) Tyler standard screen. Carbon particles were continuously removed from the bottom of the mass of carbon particles with the molten by-product and especially as fines entrained in the product gas.

Example I

Chlorine and molten calcium fluoride ($Cl/CaF_2$ mole feed ratio=0.75) were flowed countercurrently to each other at a pressure of 500 mm. Hg abs. through a quiet bed or mass of 8–16 mesh National Carbon Company Grade BB–5 graphite. The bed was 8.5 in. diam. x 16 in. deep. Calcium fluoride powder (40–300 mesh) was fed to the top of the bed at the rate of 19.8 lb./hr. The temperature at the middle of the bed was about 1600° C. and the top surface of the reactor bed was probably near the melting point of calcium fluoride (1420° C.). The conversion of chlorine to carbon tetrafluoride was about 12%. The reactor productivity was 2.58 lb./(hr.)(sq. ft.) of carbon tetrafluoride. This example illustrates prohibitively low productivity of a shallow mass of carbon particles corresponding to less than one theoretical reaction stage.

Example II

An intimate mixture of acid-grade fluorspar and calcined coke flour (45% through 200 mesh) in stoichiometric proportions for forming carbon tetrafluoride by the reaction $2CaF_2+C+2Cl_2 \rightarrow CF_4+2CaCl_2$ was fed to the top of the 9 foot reactor at the rate of 4.02 lb. $CaF_2$/hr. Chlorine was fed to the bottom of the reactor at the rate corresponding to a $Cl_2/CaF_2$ mole feed ratio of 0.96. The total pressure at the bottom of the packing was 42 p.s.i.g. The reactor was packed with machined graphite Raschig rings ½ in. O.D. x ½ in. long and was operated at 1530° C.

Total conversion of calcium fluoride was 21%; the conversion of calcium fluoride to carbon tetrafluoride was only 12.6%. This performance indicates that the reactor provided slightly less than one theoretical reaction stage. The average productivity of the reactor based on carbon tetrafluoride in the product gas was 13.9 lb./(hr.)(sq. ft.) of carbon tetrafluoride. After about a total of 6 hrs. operation, the reactor was shut down, cooled, and disassembled. The Raschig rings were slightly corroded, and many contained a loose plug of solidified slag. The surface of the graphite rings was free of any visible slag coating. The coke flour was dry and powdery. Although the surface of the recovered plugs and pellets of solidified slag was darkened by adherent carbon, the surface of fresh fractures was white. These facts indicate that the molten slag neither spread over smooth carbon surfaces nor contained dispersed carbon flour; in short, the molten slag did not "wet" the carbon. Only 45% of the coke flour fed was recovered with the packing, most of the remainder (about 35%) having been carried out of the reactor mainly by the product gas. Although the coke flour was distributed throughout the reactor packing, its concentration in the top quarter of the bed was 2½ times that in the rest of the bed. This example illustrates the non-wetting of the carbon particles or rings by the molten $CaF_2=CaCl_2$ and also increased productivity as depth of the mass of carbon particles is increased.

Example III

The reactor was packed with ⅛–¼ in. calcined petroleum coke. Several runs were made with countercurrent flow of the calcium fluoride and the chlorine under the following conditions: temperature 1510–1540° C.; pressure 40 p.s.i.g.; calcium fluoride feed rate 3.64–4.36 lb./hr.; $Cl_2/CaF_2$ mole feed ratio 0.9–1.1; gas pressure drop through the reactor 40–50 in. $H_2O$.

Total calcium fluoride conversion was 48.6% and conversion of calcium fluoride to carbon tetrafluoride in the product gas was 37.1% based on the reaction:

$$2CaF_2 + 2Cl_2 + C \rightarrow CF_4 + 2CaCl_2$$

This performance indicates that the reactor provided nearly three theoretical reaction stages. On a chlorine basis, total conversion was 50.5% and conversion to carbon tetrafluoride was 36.5%. Typical product distribution in the product gas, expressed in mole percent on a nitrogen-and-argon-free basis, was: $CF_4$ 22.0, $CF_3Cl$ 4.3, $CF_2Cl_2$ 0.4, $CFCl_3$ less than 0.1, $SiF_4$ 0.6, HF 9.1, occasional traces of COFCl, $Cl_2$ 48.1, the remainder being chiefly HCl and $COCl_2$. The average reactor productivity was 37 lb./(hr.)(sq. ft.) of carbon tetrafluoride in the product gas and 45 lb./(hr.)(sq. ft.) of total carbon tetrafluoride, where "total" indicates $CF_4$ plus $CF_4$ equivalent of $CF_3Cl$, $CF_2Cl_2$, and $CFCl_3$ based on carbon content. Productivity of total carbon tetrafluoride is the limit approached if the chlorofluorocarbons were separated from the product gas and recycled to the bottom of the reactor. This example illustrates the increased high productivity corresponding to increased depth of carbon particle mass and small size carbon particles.

Example IV

The reactor was packed with ¼ to ½ in. calcined petroleum coke particles: 1% by wt. on 2 mesh (0.525 in. opening), 87% on 3 mesh (0.263 in. opening), 12% on 6 mesh (0.065 in. opening) Tyler standard screen. Countercurrent flow of the calcium fluoride and the chlorine through the packed bed under conditions comparable with those of Example III was effected during a total of 36 hr. on stream.

The conversion of calcium fluoride to carbon tetrafluoride was 12.7%. Chlorofluorocarbons were produced in amounts, expressed as moles/mole of carbon tetrafluoride, as follows: $CF_3Cl$ 0.39, $CF_2Cl_2$ 0.059, and $CFCl_3$ 0.010. The average reactor productivity was 16.6 lb./(hr.)(sq. ft.) of carbon tetrafluoride present in the product gas and 24.3 lb./(hr.)(sq. ft.) of "total" carbon tetrafluoride. The reactor productivity with ⅛–¼ in. coke used in Example III was some 90% greater than the reactor productivity with ¼–½ in. coke packing used in this example.

Example V

A 190% excess of chlorine over the stoichiometric amount to form carbon tetrafluoride by the reaction $2CaF_2 + C + 2Cl_2 \rightarrow CF_4 + 2CaCl_2$ was supplied for 5½ hrs. to the reactor packed with ⅛–¼ in. calcined petroleum coke. The reactor temperature was 1512° C.; the pressure 39 p.s.i.g.; the calcium fluoride feed rate 1.45 lb./hr.; and the $Cl_2/CaF_2$ mole feed ratio 2.90.

The chlorine conversion totaled 17.2 with 10.5% of the chlorine going to carbon tetrafluoride and 3.8% going to chlorotrifluoromethane. The total conversion of calcium fluoride was 44.6%, and the conversion to carbon tetrafluoride was 30.6%. Carbon tetrafluoride was the major halocarbon present, on a mole basis, in the product gas. The reactor productivity based on carbon tetrafluoride present in the product gas was 9.1 lb./(hr.)(sq. ft.). This example illustrates the decreased productivity as the ratio of $Cl_2$ versus the $CaF_2$ is increased to about 3:1.

Example VI

A 320% excess of calcium fluoride over the stoichiometric amount to form carbon tetrafluoride by the reaction $2CaF_2 + C + 2Cl_2 \rightarrow CF_4 + 2CaCl_2$ was supplied to the reactor for 4.8 hrs. The reactor temperature was 1520° C.; the pressure 28 p.s.i.g.; the calcium fluoride feed rate 3.34 lb./hr.; and the $Cl_2/CaF_2$ mole feed ratio 0.236.

The chlorine conversion totaled 99.7% with 86% of the chlorine feed going to carbon tetrafluoride and 1.6% going to chlorotrifluoromethane. The total conversion of calcium fluoride was 23.4% by gas analysis and 26.3% by slag analysis. Conversion of calcium fluoride to carbon tetrafluoride was 20.3%. The reactor productivity based on carbon tetrafluoride present in the product gas was 18.6 lb./(hr.)(sq. ft.) of carbon tetrafluoride. This example illustrates the decreased productivity as the ratio of $Cl_2$ to $CaF_2$ is decreased to about 1:4.

Example VII

The reactor was operated for 1½ hrs. at a pressure of 8 p.s.i.g. The reactor temperature was 1535° C.; the calcium fluoride feed rate 2.65 lb./hr.; and the $Cl_2/CaF_2$ mole feed ratio 0.86. A reduced rate of calcium fluoride feed was used in order to compensated for the increased volumetric flow rate of chlorine at the lowered operating pressure and to avoid flooding or fluidization of the reactor packing.

The chlorine conversion totaled 45.3%, with 33.3% of the chlorine feed going to carbon tetrafluoride. The total conversion of calcium fluoride was 37%, and the conversion to carbon tetrafluoride was 28.4%. The reactor productivity based on carbon tetrafluoride in the product gas was 20.4 lb./(hr.)(sq. ft.) of carbon tetrafluoride. There is a substantial reduction in the performance of the column as compared with Example III, illustrating the effect of lowered reactor pressure and increased linear flow rate of chlorine.

Example VIII

The reactor temperature was held at 1680° C. for ½ hr. The reactor pressure at the chlorine inlet was 42 p.s.i.g.; the calcium fluoride feed rate 3.61 lb./hr.; and the $Cl_2/CaF_2$ mole feed ratio 1.09.

The total chlorine conversion was 29%, and the conversion of chlorine to carbon tetrafluoride 17.2%. Conversion of chlorine to chlorotrifluoromethane was 7.5%. Twenty-nine percent of the calcium fluoride was converted, the conversion to carbon tetrafluoride in the product gas was 18.8. Reactor productivity based on carbon tetrafluoride in the product gas was 18.5 lb./(hr.)(sq. ft.) of carbon tetrafluoride, a marked reduction from the reactor productivity at 1510–1540° C. (Example III), illustrating the effects of changing the reaction zone temperature.

Example IX

The reactor temperature was maintained at 1480° C.; the pressure at 38 p.s.i.g.; the calcium fluoride feed rate at 3.61 lb./hr.; and the $Cl_2/CaF_2$ mole feed ratio at 1.09.

Comparison of the results of this operating condition with those of Examples III and VIII clearly indicates a peak in performance of the reactor in the temperature range of about 1510 to about 1540° C.

| Ex. | Temp., ° C. | Conversion of Chlorine, Percent | | Conversion of $CaF_2$, Percent | | Reactor Productivity of $CF_4$, lb./hr. sq. ft. |
|---|---|---|---|---|---|---|
| | | Total | to $CF_4$ | Total | to $CF_4$ | |
| VIII | 1,680 | 29.0 | 17.2 | 29.1 | 18.8 | 18.5 |
| III | 1,510–1,540 | 50.5 | 36.5 | 48.6 | 37.1 | 32. |
| IX | [1] 1,480 | 22.4 | 10.9 | 21.5 | 11.8 | 11.7 |
| IX | [2] 1,480 | 21.4 | 12.3 | 21.2 | 13.6 | 14.3 |

[1] Reactor pressure 38 p.s.i.g.
[2] Reactor pressure 100 p.s.i.g.

Increase of the reactor pressure at 1480° C. to 100 p.s.i.g. under otherwise comparable conditions increased slightly the conversions of chlorine and calcium fluoride to carbon tetrafluoride as well as the reactor productivity. Increase in reactor pressure above 40 p.s.i.g. definitely improves reactor performance but to a smaller extent than increase in reactor pressure at pressures below 40 p.s.i.g. (see Example VII).

Example X

Chlorine admixed with chlorotrifluoromethane, the chlorofluorocarbon present in the largest proportion on a mole basis in the product gas from Example III, was fed to the reactor in order to simulate the effect of recycling the chlorofluorocarbon byproducts to the reactor. The feed contained 56% $CF_3Cl$ and 44% $Cl_2$ measured in chlorine equivalents. The reactor temperature was 1520° C.; the reactor pressure 42 p.s.i.g.; the calcium fluoride feed rate 4.1 lb./hr.; and the $Cl_2/CaF_2$ mole feed ratio 1.23.

The product distribution in chlorine equivalents was 53.6% $CF_4$, 10.4% $CF_3Cl$, 0.9% $CF_2Cl_2$, 0.1% $CFCl_3$, 31.8% $Cl_2$ and 3.2% HF. The ratio of carbon tetrafluoride to chlorotrifluoromethane in the product gas was practically the same as in runs with pure chlorine feed, showing that chlorotrifluoromethane can be converted to carbon tetrafluoride by recycling the chlorofluorocarbon to the reactor.

Example XI

The reactor temperature was maintained in the range 2130–2190° C. The reactor pressure was 10 p.s.i.g.; the calcium fluoride feed rate 0.71 lb./hr.; and the $Cl_2/CaF_2$ mole feed ratio 1.2.

Conversion of the calcium fluoride to carbon tetrafluoride was 17.7%, to all chlorofluorocarbons 6.5%, and to all other products (chiefly hydrogen fluoride) 21.6%. The relative molar amounts of carbon tetrafluoride and chlorofluorocarbons in the product gas were $CF_4$ 65.5, $CF_3Cl$ 29.0, $CF_2Cl_2$ 3.7, and $CFCl_3$ 1.7. Reactor productivity based on carbon tetrafluoride in the product gas was 3.4 lb./(hr.)(sq. ft.). This example illustrates that at the elevated reactor temperatures the productivity is significant though considerably reduced. Thermodynamic calculations indicate that carbon tetrafluoride can be prepared by this method at elevated temperatures where carbon tetrafluoride is stable, i.e., to about 2500° C., depending on pressure and composition.

Example XII

An equimolar mixture of calcium fluoride and calcium chloride was fed to the reactor at a rate providing 0.63 lb./hr. of calcium fluoride to the reactor. The reactor was operated at about 907° C. and 62 p.s.i.g. pressure with a $Cl_2/CaF_2$ molar feed ratio of 3.06. Although the product gas contained substantially no carbon tetrafluoride, the relative molar amounts of chlorofluorocarbons therein were $CF_3Cl$ 6.3, $CF_2Cl_2$ 53.4, and $CFCl_3$ 39.6. The total conversion of calcium fluoride to these chlorofluorocarbons was 1.7%. Higher conversion of the calcium fluoride should result from longer residence time of the calcium-fluoride-containing melt in the packed carbon bed. Such longer residence time may be obtained by use of a taller reactor having a deeper packed carbon bed. This example illustrates the failure to produce $CF_4$ at this low reactor operating temperature, although certain chlorofluorocarbons were produced.

Example XIII

The molten by-product produced in a succession of runs similar to Example VIII, the reaction-zone temperature being at selected values in the range 1480–1680° C. and the reactor pressure at selected values in the range 22–42 p.s.i.g., was accumulated in a thermally insulated receiver, forming a cake weighing 27.2 lb. This slowly cooled by-product contained by chemical analysis 0.52 moles $CaCl_2$/mole $CaF_2$, corresponding to 34.2% total conversion of the calcium fluoride feed. X-ray diffraction analysis indicated that the material was chiefly in the form of the compound CaFCl mixed with calcium fluoride; no evidence of the presence of calcium chloride was obtained.

A sample of this solidified by-product (57.5% $CaF_2$ by weight) weighing 4.99 g. was heated to 1050° C. in a graphite crucible in helium and dumped into 400 cc. water. The liquid was filtered leaving a residue (3.13 g. dry weight) of porous particles ranging in size from about 300 mesh to about ⅛ in. diameter.

Another sample of this solidified by-product weighing 5.15 g. was similarly heated to 1100° C., quenched in 400 cc. of water, and separated by filtration. The particulate residue (3.30 g.) contained about 94% $CaF_2$ and about 7% $CaCl_2$ by weight by chemical analysis.

This example generally illustrates (1) that the slow-cooled sample contained chiefly the undesirable double salt CaFCl, and (2) that the remelted sample of the double salt after rapid cooling can be leached to produce a residue which is primarily $CaF_2$.

Example XIV

Equimolar quantitites of dry powdered calcium chloride (5.50 g.) and dry powdered calcium fluoride (3.90 g.) were loaded into each of several graphite crucibles. The loaded crucibles were heated 3 hr. in an argon atmosphere in an electric muffle furnace at 500° C., each crucible was then heated at a selected higher temperature for at least 20 min. The melted contents of a first crucible heated to 850° C. were poured into 400 cc. of water, thereby quenching and granulating the molten salt. The resulting slurry was stirred for 5 min. to leach calcium chloride from the solids and was allowed to settle for 1 min. Then the supernatant liquid was poured away from the sediment; the constant-pressure filtration rate of the supernatant liquid was determined; the supernatant liquid was evaporated to dryness and weighed, and the sediment was dried and weighed. The same procedure was followed starting with a second loaded crucible heated to 950° C. A third loaded crucible was slowly cooled from 950° C. to room temperature by embedding it in tabular alumina. The slowly cooled salt, ground by mortar and pestle to about the particle size of the granulated sediments, was added at room temperature to 400 cc. water. The slurry was stirred 5 min. and subsequently treated the same as the slurries of material from the first and the second crucibles. The results follow:

TABLE I

|  | Equimolar Mixtures of Calcium Chloride and Calcium Fluoride | | | |
|---|---|---|---|---|
|  | Slow Cooled from 950° C. | Quenched from 850° C. | Quenched from 950° C. | Tap Water |
| Resistance to Filtration of Supernatant Slurry, Relative $\alpha w$ | 4.82 | 0.41 | 0.13 | Nil. |
| Dry Weight Sediment, g | 1.87 | 4.21 | 3.82 | Nil. |
| Supernatant Slurry, g | 7.20 | 5.05 | 6.05 | Nil. |
| Total | 9.07 | 9.26 | 9.87 |  |

The method of evaluating the term "$\alpha w$" and its significance are explained on p. 19–57, FIG. 19–86 (a) of J. H. Perry et al., "Chemical Engineers' Handbook," New York, McGraw-Hill Book Company, 4th ed. (1963). Briefly $\alpha$ is the average specific resistance of the filter cake, $w$ is the weight of dry-cake solids per unit weight of filtrate in the feed slurry, and the difficulty of filtering slurry under otherwise identical conditions increases as $\alpha w$ increases.

Although crystalline calcium fluoride is substantially insoluble (about 16 p.p.m. at 25° C.) as a true solution in water, the partly leached sediment recovered from the salt mixture slowly cooled from 950° C. amounted to only 1.87 g., corresponding to only 48% by weight maximum recovery of calcium fluoride. The supernatant liquid poured away from the sediment was quite turbid and appeared blue-gray by scattered light but orange by transmitted light, indicating the presence of colloidal calcium fluoride in the supernatant liquid. This indicates the difficulty in recovering the $CaF_2$ from the slow-cooled sample (1) because of the much smaller amount of $CaF_2$ remaining in the sediment after the leaching liquid was removed, and (2) because of the large amount of difficultly filterable colloidal $CaF_2$ carried off in the leaching liquid after dissolving the double salt CaFCl.

Certain special requirements of the particular calcium fluoride recovery and recycling portion of the preferred process involve a sufficiently high temperature of the by-product to maintain it (1) in a molten or liquid condition and (2) above the temperature at which the difficultly separable double salt CaFCl is formed or exists. These requirements are matched, and cooperate with, certain characteristics of the particular counter-current chemical reaction portion of the process to produce improved and beneficial results. The particular countercurrent form of the chemical reaction portion of the process, for example, produces at the bottom of its reaction zone only the molten by-product comprising calcium fluoride and calcium chloride for direct removal without the need for a separation from other products or by-products. Also the particular countercurrent form of the chemical reaction portion of the process is easily controlled to maintain uniform high temperature conditions throughout the height of the reaction zone including the lower portion thereof. This tends toward improved production of carbon tetrafluoride and also maintains the by-product in the lower portion of the reaction zone at the high temperatures required to maintain its molten condition, and also at a temperature high enough to avoid formation of the undesirable double salt CaFCl which would interfere with effective separation and recycling of $CaF_2$ from the by-product after it has been removed from the reaction zone. In addition, the particular, multi-reaction stage aspect of the countercurrent chemical reaction portion of the process produce reasonably low percentages of calcium fluoride in the by-product from the reaction zone. This helps insure that the by-product removed from the reaction zone is molten at its required exit or removal temperature.

The overall process is more reliable and effective because of the decreased susceptibility of the particular countercurrent reaction portion to flooding and plugging. This is due to the presence of only a minor weight fraction of carbon particles smaller than about ⅛ in. diameter in the carbon feed and the controllable predictable manner in which the carbon particles are consumed and removed from the reactor as has previously been discussed. Also the overall process is more easily controllable because of the improved control possible over the temperatures and reaction rates of the particular countercurrent reaction employed.

The characteristics of the calcium fluoride recovery and recycling portion of the process have an advantageous cooperating relationship with the chemical reaction portion in that the molten by-product is removed from the reactor at elevated temperature suitable for quenching to readily recover calcium fluoride and in that the heating of the calcium fluoride to between 500° and 900° C. in the recycling portion not only removes the undesirable moisture but provides a substantial portion of the heat required to bring the recycled calcium fluoride up to its melting point to take part in the basic chemical reaction.

It is believed to be clear that a novel, and improved process combination has been provided in which the particular features of the basic chemical reaction and of the recovery and recycling arrangement cooperate to produce beneficial and improved results.

Although certain embodiments of the invention have been described, or illustrated in some detail, many variations and modifications within the spirit of the invention will occur to those skilled in the art, and all such are considered to fall within the scope of the following claims.

What is claimed is:

1. An improved continuous high efficiency process for producing carbon tetrafluoride comprising the following steps in combination: continuously flowing a stream of upwardly moving gaseous chlorine and a stream of molten downwardly moving calcium fluoride, with the molar ratio of chlorine to calcium fluoride being in the range from about 2:3 to about 3:2, countercurrently to each other through a vertically elongated mass of carbon particles confined in a reaction zone, said mass predominantly composed of carbon particles having dimensions in the range between about ⅛ inch minimum and a maximum of about 2 inches or 1/16 of the minimum transverse dimension of the mass of carbon particles which ever is the smaller, the temperature in said zone maintained in the range from about 1500° C. to about 1550° C., the pressure of said stream of gaseous chlorine maintained between about atmospheric pressure and about four atmospheres as said stream enters said mass, to form a gaseous product comprising a high percentage of carbon tetrafluoride and a minor percentage of chlorofluorocarbons chlorine-free basis and to form a molten by-product comprising calcium chloride and calcium fluoride; continuously removing said gaseous product from an upper portion of said zone, separating from said product a gaseous fraction consisting essentially of chlorine and chlorofluorocarbons, and adding said gaseous fraction to said stream of gaseous chlorine, said process further comprising continuously removing from a bottom portion of said zone said molten by-product at a temperature significantly above about 800° C., separating from said by-product a fraction consisting essentially of calcium fluoride by quenching and leaching said by-product with water, adding said fraction to said stream of calcium fluoride, and adding carbon particles to an upper portion of said mass to maintain the size of the mass and the average particle size within desired operating limits.

2. An improved continuous high efficiency process for producing carbon tetrafluoride comprising the following steps in combination, continuously flowing an upwardly moving stream of gaseous chloride and a downwardly moving stream of molten calcium fluoride at a temperature at least about 1400° C., with a molar ratio of chlorine to calcium fluoride being in the range from about 1:4 to about 4:1, countercurrently to each other through a vertically elongated mass of carbon particles in a reaction zone, said carbon particles having dimensions in the range between about ⅛ inch minimum and a maximum of about 2 inches or ¹⁄₁₆ of the minimum transverse dimension of the mass of carbon particles whichever is the smaller, at a temperature in the range from about 1300° C. to about 2500° C., the pressure of said stream of gaseous chloride maintained between about atmospheric pressure and about eight atmospheres just prior to its passing through said mass, to form a gaseous product comprising a high percentage of carbon tetrafluoride, and to form a molten by-product comprising calcium chloride and calcium fluoride, continuously removing said gaseous product from an upper portion of said zone, continuously removing said molten by-product from a bottom portion of said mass at a temperature significantly above about 800° C. and commencing while said molten by-product temperature lies above about 800° C., rapidly cooling said molten by-product to at least about 400° C. to form a solidified by-product, treating said solidified by-product with water to remove calcium chloride present and leave a residue essentially consisting of calcium fluoride, heating said residue, and adding said heated residue to said stream of calcium fluoride, the temperature of said molten by-product before cooling being sufficiently high and said cooling being sufficiently rapid to prevent formation of the double salt compound CaFCl.

3. The improved process of claim 2 in which said molten by-product is cooled by quenching in a bath of cooling water, and substantially all of said calcium chloride is leached from said by-product by said cooling water, said process further comprising removing said water containing dissolved calcium chloride and heating said residue to between 500–900° C. to dry the same before addition of said residue in heated dried condition to said stream of calcium fluoride.

4. The improved process of claim 3 in which said quenching action is accomplished concurrently with impingement of a water jet upon said by-product to comminute the same in order to speed up the quenching and leaching action.

5. An improved continuous high efficiency process for producing carbon tetrafluoride comprising in combination the following steps: flowing a stream of molten calcium fluoride downwardly through a substantially quiet mass of reactive carbon particles in a vertically elongated reaction zone, at least 75% by weight of said mass of said particles having dimensions in the range between about ⅛ inch minimum and a maximum of about 2 inches or ¹⁄₁₆ of the minimum transverse dimension of the mass of carbon particles whichever is the smaller, flowing a stream of gaseous chlorine upwardly through said mass, supplying additional carbon particles in the said size range to the upper end of said vertically elongated reaction zone to replace particles consumed by the process reaction and maintain the average particle size within desired operating limits, while controlling the temperature in the reaction zone to give an average temperature in said mass between about 1300° C. and about 2500° C., controlling the pressure in the reaction zone at a level between about one-half atmosphere absolute and about eight atmospheres absolute, and controlling the input molar ratio of chlorine to calcium fluoride in the range from about 1:4 to about 4:1, said process resulting in the production of a gaseous product comprising carbon tetrafluoride at the upper end of said vertically elongated reaction zone, and resulting in the production of a molten by-product comprising calcium chloride and calcium fluoride at the lower end of said zone, said process further comprising the steps of continuously removing said gaseous product, continuously removing said molten by-product from a bottom portion of said reaction zone at a temperature significantly above about 800° C. rapidly cooling to below about 400° C. and separating calcium fluoride from said by-product by contacting with water and adding said separated calcium fluoride to said stream of calcium fluoride.

6. In an improved continuous high efficiency process for producing carbon tetrafluoride, the combination comprising the following steps: continuously flowing a stream comprising gaseous chlorine and a stream comprising molten calcium fluoride, with the molar ratio of chlorine to calcium fluoride being in the range from about 1:4 to about 4:1, countercurrently to each other through a vertically elongated mass of carbon particles confined in a reaction zone, said elongated mass having a minimum transverse dimension, said mass predominantly composed by weight of carbon particles having dimensions in the range between about ⅛ inch and about ¹⁄₁₆ of the minimum transverse dimension of said mass of particles, the temperature in said zone being maintained in the range from about 1300° C. to about 2500° C., the pressure of said stream of gaseous chlorine maintained between about atmospheric pressure and about eight atmospheres as said stream enters said mass, to form a gaseous product comprising carbon tetrafluoride, chlorine, and chlorofluorocarbons, and to form a molten by-product comprising calcium chloride and calcium fluoride; continuously removing said gaseous product, separating from said product a gaseous fraction consisting essentially of chlorine and the chlorofluorocarbons, said process further comprising continuously removing said molten by-product from a bottom portion of said zone and about the temperature at which the double salt compound CaFCl is formed or exists, and adding carbon particles to said mass to maintain the size of the mass and the average particle size within desired operating limits.

7. The improved process of claim 6 in which said molten by-product is removed at a temperature significantly above about 800° C.

8. An improved process for effectively recovering calcium fluoride from a molten stream of calcium chloride and calcium fluoride above about 800° C., said process comprising in combination the following steps: rapidly quenching said molten stream consisting of calcium chloride and calcium fluoride, from a temperature above about 800° C. to at least about 400° C., in contact with a cooling medium to form a solidified product essentially composed of calcium fluoride and calcium chloride, dissolving the calcium chloride in water, and removing the dissolved calcium chloride, the temperature of said stream before quenching being sufficiently high and the rapid quenching accomplished with a time interval sufficiently short to prevent formation of the double salt compound CaFCl.

9. The improved process of claim 8 in which said quenching action is accomplished concurrently with impingement of a water jet against said stream to comminute the same in order to speed up the quenching and dissolving action.

References Cited
UNITED STATES PATENTS

| | | | |
|---|---|---|---|
| 2,709,185 | 5/1955 | Muetterties | 260—653 |
| 2,924,623 | 2/1960 | Hager | 260—653 |
| 3,206,515 | 9/1965 | Olstowski et al. | 260—653.8 |

DANIEL D. HORWITZ, *Primary Examiner.*

UNITED STATES PATENT OFFICE
CERTIFICATE OF CORRECTION

Patent No. 3,386,989                                       June 4, 1968

Peter Karl Baumgarten

It is hereby certified that error appears in the above numbered patent requiring correction and that the said Letters Patent should read as corrected below.

Column 13, line 6, for "chloride" read -- chlorine --; column 14, line 39, for "about" read -- above --.

Signed and sealed this 29th day of April 1969.

(SEAL)
Attest:

Edward M. Fletcher, Jr.                                EDWARD J. BRENNER
Attesting Officer                                         Commissioner of Patents